April 28, 1970     L. A. GUIDO ET AL     3,509,358

STANDBY PULSE GENERATOR

Filed Dec. 6, 1967

INVENTORS
LOUIS A. GUIDO
BY JOHN J. KING

ATTORNEY

United States Patent Office 3,509,358
Patented Apr. 28, 1970

---

3,509,358
STANDBY PULSE GENERATOR
Louis A. Guido, Northport, and John J. King, Jericho, N.Y., assignors to Sperry Rand Corporation, a corporation of Delaware
Filed Dec. 6, 1967, Ser. No. 688,503
Int. Cl. H08g 1/08
U.S. Cl. 307—106          2 Claims

ABSTRACT OF THE DISCLOSURE

Standby pulse generating apparatus particularly suitable for vehicular traffic control systems for providing a pulse train of evenly spaced pulses including a distinctive start pulse.

BACKGROUND OF THE INVENTION

Field of the invention

The present invention pertains to standby pulse generators for providing a pulse train having a distinctive start pulse in the event of failure of a normally provided pulse train in traffic intersection controllers, for example, of the type disclosed in U.S. patent application Ser. No. 453,072 entitled "Traffic Intersection and Other Controllers Responsive to a Cyclic Pulse Train," invented by John J. King, filed May 4, 1965.

Description of the prior art

To fully appreciate the problems that have been overcome and to more readily understand the advantages of the present invention requires a brief description of the problems involved.

As disclosed in said U.S. patent application Ser. No. 453,072, cycle information is transmitted from a master controller to local traffic intersection controllers by a variable frequency pulse train whose frequency is proportional to cycle duration. This pulse train is utilized for the internal timing of the local traffic intersection controller mechanism. The failure of the pulse train from the master controller would, in the absence of the present invention, result in the loss of traffic control at a plurality of intersections supervised by the master controller. The present invention provides a fixed frequency standby pulse generator in each of the local intersection controllers which is activated in the event of failure of the normal cycle pulse train to provide a standby cycle pulse train.

A further problem relates to the synchronization of the standby pulse generators within the aforementioned plurality of intersections normally supervised by the master controller. At the time of failure of the normal cycle pulse train, there are no direct electrical interconnections with the other local intersection controllers other than the A.C. power lines. Thus, synchronization among the local intersection controllers is required to initially generate the standby cycle pulse trains simultaneously and to cause the local intersection controllers to revert back to normal operation when the failure has been corrected while maintaining synchronization.

An additional problem could arise if there is a substantial variation in the standby start pulse duration and position with respect to the cycle pulse. The present invention utilizes magnetic reed switches actuated by rotating magnets which are susceptible to magnetic fields. With this configuration, the principal cause of variation in the standby start pulse is due to the presence of external magnetic fields, both A.C. and D.C. in character.

SUMMARY OF THE INVENTION

The present invention utilizes a standby pulse generator to provide a cyclic pulse train having a distinctive start pulse in the event of failure of the cycle pulses from the master controller. The cycle pulses are generated by means of magnetic reed switches proximate respective rotating permanent magnets. The permanent magnets are caused to stop and start at predetermined positions thereby providing synchronization throughout the supervised area. Further, logic circuits are designed to control the duration and position of the standby start pulse in conjunction with the magnetic reed switches in spite of the presence of unknown external magnetic fields.

A feature is also provided for manually synchronizing the standby pulse generator at each intersection. By referring to a known external time reference, the operation of the standby pulse generator can be initiated by physically operating a switch on the control panel of the local intersection controller. This is particularly desirable in synchronizing controllers on a common traffic artery in the initial stages of system installation in the absence of a master controller timing reference.

DESCRIPTION OF THE PREFERRED EMBODIMENT

A detailed explanation of a traffic intersection controller is provided in said U.S. patent application Ser. No. 453,072 as well as an explanation of certain terms and will not be repeated herein for the sake of brevity. Referring to FIG. 1b of said U.S. patent application Ser. No. 453,072, a standby unit 150 is disclosed in block form which provides standby start pulses and standby cycle pulses.

Figure 1:
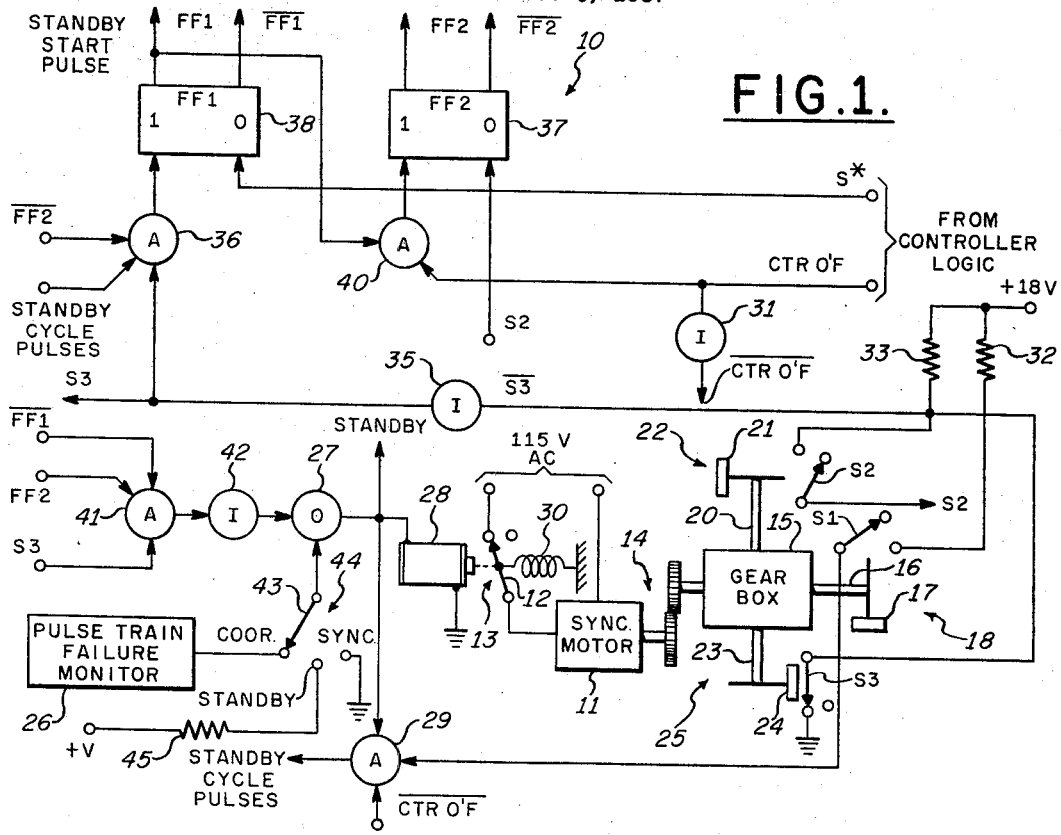
FIG. 1 is a schematic diagram in block form of a preferred embodiment of a standby pulse generator.

Referring now to FIG. 1 of the instant application, a standby pulse generator 10 which may be utilized in the traffic intersection controller of the aforementioned patent application includes a syichronous motor 11 selectively energized by means of a 115 v. A.C. power source as indicated by the legend when a relay 13 is energized to position its spring loaded contact arm 12, in a manner to be more fully explained. The output shaft of the synchronous motor 11 is connected via change gears 14 to a gear box 15. An output shaft 16 is coupled in the gear box 15 by means of 1 to 1 gearing to the change gears 14 for rotating the magnet portion 17 of a magnetic reed switch 18. The magnetic reed switch 18 has a contact arm S1 cooperative with the magnet 17 in order that the contact arm S1 makes and breaks to provide continuous uniform standby cycle pulses having a 30 millisecond duration with 300 milliseconds between the leading edges of respective pulses, for example. An output shaft 20 of the gear box 15 is connected to rotate a magnet 21 at a speed that is ½₀₀ of the speed of the magnet 17. The magnet 21 forms a portion of a magnetic reed switch 22 which has a contact arm S2. An output shaft 23 of the gear box 15 also rotates a magnet 24 at a speed ½₀₀ of the speed of the magnet 17. The magnet 24 forms a portion of a magnetic reed switch 25 which has a contact arm S3. The magnets 21 and 24 are diametrically opposed with respect to each other in order that the contact arm S2 will close approximately 180° out-of-phase with respect to the contact arm S3.

As explained in U.S. Patent No. 3,350,580 entitled "Monitor Employing Logic Gate and Counter to Indicate Normal Pulse-Train Failure After Predetermined Time Interval," invented by John S. J. Harrison and issued Oct. 31, 1967 in the coordinated mode, a pulse train failure monitor 26 will provide a signal via the contact arm 43 of a front panel selector switch 44 and an OR gate 27 to energize the winding 28 of the relay 13 upon a failure of the normal pulse train from the master controller. The output of the OR gate 27 further provides a standby signal indicated by the legend for use in the traffic intersection controller of said U.S. patent application Ser. No. 453,072 as well as a signal to one input terminal of an AND gate 29.

When the relay 13 is energized, the contact arm 12 is positioned against the spring 30 (which normally holds the contact arm 12 open) to permit A.C. power to be applied to the synchronous motor 11. The synchronous motor 11 drives the magnets 17, 21 and 24 at the speeds indicated above to actuate the respetcive magnetic reed switches 18, 22 and 25. Closure of the contact arm S1 of the switch 18 initiates the standby cycle pulses via the AND gate 29 which has another input terminal energized by the signal from the closure of the contact arm S1 and a third input terminal energized by the absence of the counter overflow signal, i.e., $\overline{\text{CTR O'F}}$. The output of the AND gate 29 provides the standby cycle pulses as shown in FIG. 2.

Figure 2:
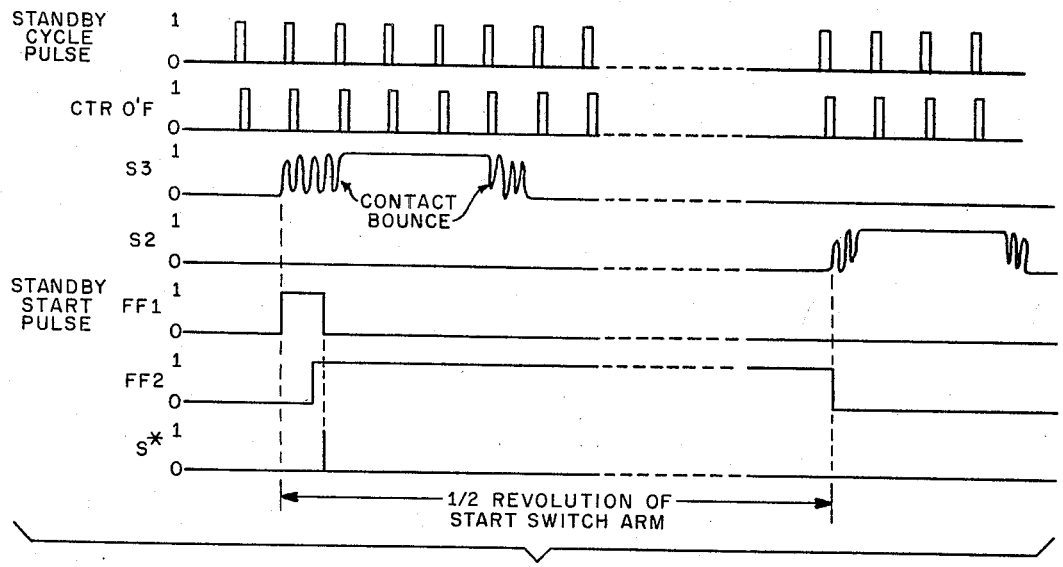
FIG. 2 is a graph showing the waveforms of the signals associated with the standby pulse generator of FIG. 1.

The counter overflow signal, CTR O'F as shown in FIG. 2, may be provided from the counter 20 via the set output terminal of the flip-flop FF2 as shown in FIG. 1 of U.S. patent application Ser. No. 543,430 entitled "Pulse Width Discriminator," invented by John J. King and filed Apr. 18, 1966. The counter overflow not signal $\overline{\text{CTR O'F}}$ may be provided by inverting the counter overflow signal CTR O'F by means of an inverter circuit 31. In the closed position, the contact arm S1 is connected through a current limiting resistor 32 to a source of positive potential such as +18V as indicated by the legend. The contact arms S2 and S3 are also connected through a common resistor 33 to the +18V source. In the closed position, the contact arm S3 is connected to ground potential. As the standby cycle pulse is sensed in the controller, as explained in said U.S. patent application Ser. No. 543,430, a counter overflow signal CTR O'F is returned to the standby pulse generator 10 as indicated by the legend which terminates the standby cycle pulse by disabling the AND gate 29. The counter overflow signal CTR O'F is maintained for a time interval greater than the dwell time of the contact arm S1.

Continued rotation of the synchronous motor 11 initiates the standby start pulse (also called FF1 as shown in FIGS. 1 and 2) by the operation of the contact arm S3 in conjunction with the contact arm S1. During the dwell time of the contact arm S3, the contact arm S1 is arranged to have a plurality of closures since the magnet 17 rotates at a speed 200 times greater than that of the magnet 24. The absence of the $\overline{\text{S3}}$ signal, i.e., S3 (shown in FIG. 2) occurs when the S3 switch is closed thereby grounding the +18V potential. The $\overline{\text{S3}}$ signal is connected via an inverting circuit 35 to an input terminal of an AND gate 36. The standby cycle pulse signal is connected to another input terminal of the AND gate 36 while its third input terminal is responsive to an $\overline{\text{FF2}}$ signal from the reset terminal of a flip-flop 37. The S3 signal enables the AND gate 36 since the other two signals are present thereby setting a flip-flop 38. The output of the set output terminal of the flip-flop 38 provides the initiation of the standby start pulse (FF1) as shown in FIG. 2. The set output terminal of the flip-flop 38 is connected to an input terminal of an AND gate 40 which has its other input terminal responsive to the counter overflow CTR O'F signal and is now enabled to set the flip-flop 37 to provide an output signal FF2 (shown in FIG. 2) from its set output terminal. The purpose of the flip-flop 37 is to prevent multiple actuations of the flip-flop 38 by disabling the AND gate 36 since the $\overline{\text{FF2}}$ signal is now no longer available on its third input terminal.

The application of the standby start pulse to the intersection controller as shown in FIG. 2 of U.S. patent application Ser. No. 671,737 entitled "Offset Change Apparatus for Traffic Control Systems," invented by David Arlen and John J. King and filed Sept. 29, 1967 provides an S* signal (shown in FIG. 2) when the output FF1 of the set output terminal of the flip-flop 38 is recognized as a start pulse. The S* signal as indicated by the legend in FIG. 1 of the instant application is applied to the reset input terminal of the flip-flop 38 thereby terminating the standby start pulse (FF1) from the set output terminal of the flip-flop 38 and providing an $\overline{\text{FF1}}$ signal from the reset output terminal of the flip-flop 38. This prevents any further standby start pulses from being generated until the flip-flop 37 is reset by the closure of the contact arm S2 to provide an S2 signal to the reset input terminal of the flip-flop 38 and the next occurrence of coincidence between the closure of the contact arms S1 and S3. The contact arm S2 is spaced 180° away from the contact arm S3 thereby allowing ample time for the contact arm S3 to open before resetting the flip-flop 37. As will be seen by referring to FIG. 2, there may be considerable contact bounce during the making and breaking of the contact arms S2 and S3. However, by utilizing the logic circuitry explained above, the undesirable effects of contact bounce are eliminated.

When the normal cyclic pulse train from the master controller is re-established, it is desirable that the synchronous motor 11 assume a known reference point in its cycle and stop in order that subsequent initiation of the standby pulse generator 10 will originate from a known reference point and thus all of the traffic intersection controllers within a given control area will start from the same reference point simultaneously. With this arrangement, the intersection controllers along a particular traffic artery may be adjusted to provide a predetermined traffic progression in the standby mode of operation during failure of the normal cyclic pulse train. This is accomplished by a zero potential appearing at the output of the pulse train failure monitor 26. This removes one of the input signals to the OR gate 27. The synchronous motor 11 continues to run until the next start pulse, i.e., FF1 is generated. At the termination of this pulse, i.e., $\overline{\text{FF1}}$, the AND gate 41 is enabled by the simultaneous signals S3, FF2 and $\overline{\text{FF1}}$ and provides a signal to an inverter circuit 42 whose output is zero thereby removing the other input to the OR gate 27, thus removing the energization of the relay 13 and disabling the AND gate 29. The spring loaded contact arm 12 opens thereby disconnecting the A.C. power to the synchronous motor 11 and the motor stops with the magnets 17, 21 and 24 in their predetermined reference positions. It will be noted that the synchronous motors in each of the intersection controllers will be de-energized at the same time and position and therefore they will be synchronized when they again are called upon to provide standby cycle pulse trains.

The change gears 14 may be designed to allow the pulse generator 10 to run in a 60, 90, 120 second cycle, for example, with 200 cycle pulses and one start pulse being produced for each complete cycle.

In the event that synchronism of the intersection controllers is required on a common traffic artery and no external source of timing pulses is available, the following procedure may be employed.

An external timing reference may be defined by means of a stop watch or other suitable device. The contact arm 43 of the front panel switch 44 of FIG. 1 is manually placed in SYNC position thereby connecting the contact arm 43 to ground potential. The motor 11 will continue to rotate until the magnets 17, 21 and 24 are halted in the SYNC position. Using the stop watch or other timing reference means, the contact arm 43 is manually positioned to its "STANDBY" position at a known reference point. This connects the contact arm 43 to a positive potential +V via a resistor 45 thereby providing a forcing signal to the OR gate 27. The output of the OR gate 27 energizes the relay 13 which in turn applies A.C. power to the synchronous motor 11, as previously described. This standby pulse generator 10 will then operate continuously in synchronism with the A.C. power line frequency.

This procedure is repeated at the next and all intersections required to be operated in synchronism thereby resulting in a synchronized traffic pattern utilizing only the standby pulse generator 10.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. Pulse generating apparatus for providing a standby pulse train having a plurality of uniformly spaced cyclic pulses and a distinctive start pulse comprising
    first magnetic reed switch means for initiating said cyclic pulses,
    second magnetic reed switch means for initiating said start pulse,
    means including motive means coupled to said first and second switch means in a predetermined order,
    means including first gating means responsive to said initiation of said cyclic pulses for providing termination thereof thereby defining the pulse width of said cyclic pulses,
    means including second gating means responsive to said initiation of said start pulse for providing termination thereof thereby defining the pulse width of said start pulse whereby a pulse train is provided having a distinctive start pulse and uniformly spaced cyclic pulses of respective predetermined pulse widths,
    pulse train monitoring means responsive to a normal pulse train for providing a failure signal in the absence thereof,
    and means including third gating means responsive to said failure signal and selectively coupled to said motive means for initiating said standby pulse train in a predetermined manner.

2. Pulse generating apparatus of the character recited in claim 1 and further including
    manually adjustable switch means coupled between said pulse train monitoring means and said means including third gating means in a coordinated mode,
    said manually adjustable switch means further having a selectable standby position responsive to a predetermined potential and a selectable sync position responsive to ground potential for standby and synchronization operation respectively.

References Cited

UNITED STATES PATENTS

| 3,333,111 | 7/1967 | Houle | 307—134 X |
| 3,370,251 | 2/1968 | Overstreet | 307—64 X |
| 3,375,492 | 3/1968 | Calsyn et al. | 340—35 |

ROBERT S. MACON, Primary Examiner

T. B. JOIKE, Assistant Examiner

U.S. Cl. X.R.

340—35, 40